March 26, 1940. H. Z. GORA 2,194,895
VALVE STEM
Filed April 14, 1937
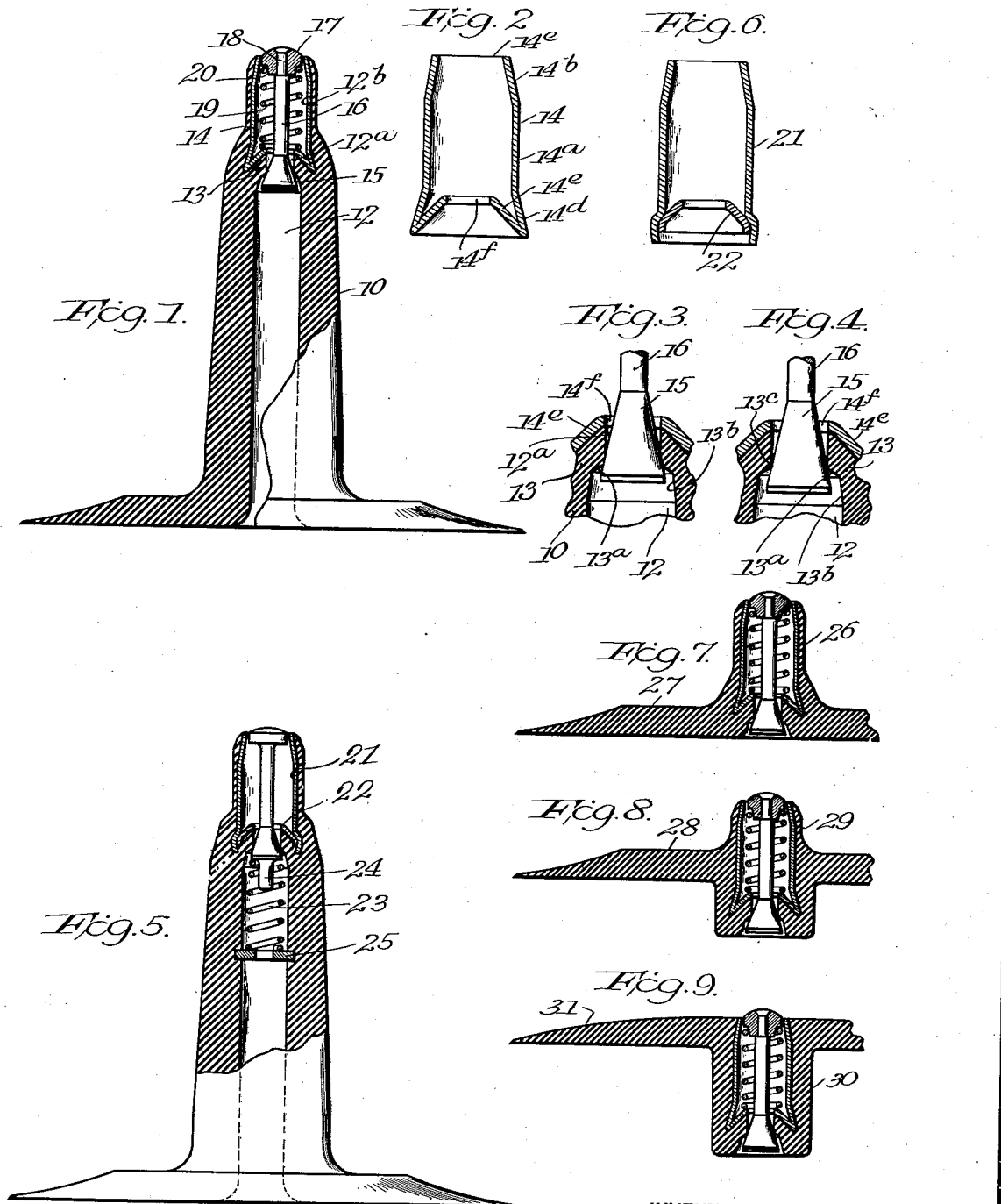
INVENTOR
Henry Z. Gora
BY
ATTORNEYS Patented Mar. 26, 1940

2,194,895

UNITED STATES PATENT OFFICE 2,194,895

VALVE STEM

Henry Z. Gora, Bridgeport, Conn., assignor to Jenkins Bros., Bridgeport, Conn., a corporation of New Jersey Application April 14, 1937, Serial No. 136,913

2 Claims. (Cl. 251—144)

This invention relates to valve stems, particularly rubber valve stems, and to improved air sealing means therefor. The invention is particularly applicable to rubber valve stems wherein an integral valve seat of the stem material is provided and will be described in detail with reference to such an embodiment as shown by way of example in the accompanying drawing.

In the drawing:

Figure 1 is an axial section of a rubber valve stem embodying the invention;

Figure 2 is an enlarged view of an insert appearing in Figure 1;

Figure 3 is an enlarged view of the sealing means appearing in Figure 1;

Figure 4 is a view similar to that of Figure 3, but showing the parts in an initial position;

Figure 5 is an axial section of a modified form of rubber valve stem embodying the invention;

Figure 6 is an enlarged view of an insert appearing in Figure 5;

Figure 7 is an axial section of a rubber valve stem of stub type embodying the invention;

Figure 8 is an axial section of a rubber valve stem of modified stub type embodying the invention; and Figure 9 is an axial section of a rubber valve stem embodying the invention and particularly applicable to inflatable bodies such as football bladders and the like.

Referring to the drawing and first to Figures 1 to 4, reference numeral 10 designates an elongated flexible rubber stem body which, as here shown, is of generally tapered form from base to tip, a flexible attachment flange or flap being formed at the base of the body 10. The stem is traversed by an axial through air passage 12.

At the tip portion of the body 10 the stem material is extended into the passage 12 to provide an integral annular constricting flange 13 providing a central passage portion 12a which is substantially cylindrical and coaxial with and forms a part of the bore 12. The flange 13 presents a downwardly faced conical shoulder surface 13a which is relatively abrupt and downwardly merges into the less abrupt conical surface 13b which enlarges to the diameter of bore 12.

Upwardly the annular conical surface 13a merges with the cylindrical passage portion 12a to provide a circular seating edge 13c for cooperation with a valve body to be later described.

Disposed in the tip portion 12b of the air passage is a tubular insert 14 made of any suitable material such as brass or other like material. The insert comprises an intermediate substantially cylindrical portion 14a and an upper tapered portion 14b and the symmetrical insert passage has similar cylindrical and tapered portions so that its tip opening 14c, which is circular, is of restricted cross sectional area. The lower end portion of the insert is outwardly flared at 14d and the lower extremity is formed with an annular inwardly directed ledge or spring abutment flange 14e of conical form and defining a central circular opening 14f which is preferably of the same diameter as the air passage portion 12a.

The insert 14 is incorporated in the tip end of the stem body 10 preferably by vulcanization during the molding operation and is coaxial with the passage 12. As here shown, the insert is laterally completely rubber covered. The flange 14e is disposed above and in substantially surrounding relation to the valve seat 13c to restrain the same against undue distortion without, however, impairing its natural resiliency.

A valve body 15 is carried on a stem or pin 16 which extends centrally upwardly in the insert 14 and has an enlarged head 17 on its upper end. The head is pierced to receive the reduced portion 18 of the pin 16 and the extremity of the latter is riveted over to hold the head on the pin. Desirably, the upper end of the hole in head 17 is reamed out to provide an indentation in order to facilitate the centering of inflating and deflating devices.

A compression spring 19 surrounds pin 16 and bears with its lower end against the seat provided by the inwardly directed flange 14e of the insert, the upper end of the spring abutting the head 17 which is preferably formed with a circumferential spring seat 20 to center the spring thereon. The spring acts to hold the body 15 against the valve seat 13c and when the valve body is thus seated the head 17, which is circular in cross section, is positioned in the tip opening 14c of the insert which, it will be recalled, is of reduced cross sectional area as compared to the lower portion of the insert. Although the head 17 is not in substantial frictional engagement with the edge of opening 14c, but is freely slidable relative thereto, it is effective to seal the air passage against dirt and other foreign substances, thereby avoiding the necessity for a valve cap or other closure. The opening in head 17 which receives the reduced portion 18 of pin 16 is centrally disposed and consequently when the head 17 is in the position shown in Figure 1, the pin 16 and valve body 15 are maintained in exact coaxial relation with the circular edge or valve seat 13c.

The head 17 cooperates with the tip end of the tubular insert to define a pocket of air between the head 17 and the valve seat and since there is substantially no movement of air into or from this pocket the head provides an effective seal for preventing the entrance of any objectional amount of dust or water. It will be understood that when the head is moved inwardly of the insert so that the valve body 15 is unseated, there is sufficient clearance between the head and the enlarging opening of the insert to permit the passage of air.

In assembly the body 15 and pin 16 are inserted to position from the base of the stem, the spring 19 is placed in the insert, and the head 17 applied.

The valve body or plug 15 is of conical form tapered toward the tip of the stem and is coaxial with pin 16. It has a considerably greater length than its possible zone of contact with the edge 13c, and projects to a considerable extent above and below the said edge when in sealing position. The taper of the valve body is preferably about 18° relative to its axis, although the degree of taper and the form of the body may be modified as desired for cooperation with modified forms of valve seats. In any event, the degree of taper of the body 15 is less than the degree of taper of surface 13a so that an initial line contact between the body 15 and seat 13c, Figure 4, is assured. With the valve body of the taper mentioned, the elements of the conical surface 13a may desirably be at about a 45° angle to the stem axis. The surface 13a could be normal to or otherwise disposed relative to the stem axis without departure from the invention, but I prefer to give it a conical form such as is shown, since the additional rubber contributes to a more effective action of the edge 13c. The passage portion 12a need not be exactly cylindrical but preferably it is substantially so. The main principle is that there should be such a change in the longitudinal contours of the stem passage as to provide a substantially line seat for cooperation with the conical valve body surface.

The configuration of the air passage 12 that provides an abrupt change in the longitudinal surface contour at the valve seat 13c provides a valve seat that makes an initial line contact with valve body, as shown in Figure 4, before the resilient material of the valve seat is somewhat compressed by the further seating action of the valve body, Figures 1 and 3, under the action of spring 19. As the body 15 moves into its air sealing position shown in Figures 1 and 3, the material of the valve seat 13c is distorted until there is a substantial band or zone of contact which, however, is always of less longitudinal extent than the conical face of the valve body, and, as above stated, since in sealing position the conical face of the valve body extends in both directions beyond the sealing zone, any embedding action of the valve body is avoided. It is believed that some rolling action of the edge 13c takes place as the valve body moves thereagainst. Sealing contact is limited to the zone of edge 13c due to the much greater acuteness of the vertex angle of the conical valve body surface as compared to the vertex angle of the conical surface 13a. When the valve body is pushed away from the valve seat the localized yielding of the seat and such rolling action as may take place facilitate the breaking of the air seal without injury to the seat. A very effective seal is provided and yet the seal is readily broken without injury to the seat during inflation or deflation.

Another important advantage of the described conical valve body and seat, is that when the valve is open the conical faces give a sweeping action to the air stream in each direction so that the surfaces are maintained clean. There is an entire absence of contours of such abruptness as might catch and retain dust particles and the like on the seating surfaces.

A uniform circumferential seal is assured by the fact that when the head 17 is in the opening 14c, the pin 16, which is normal to the plane of the circular edge 13c, serves to maintain body 15 exactly coaxial with the edge 13c. Furthermore, the insert 14 guards the pin 16 against any accidental bending and consequently there is no possibility of distorted seating of the valve body due to this cause. Full sealing effect is assured since the seat constitutes the sole stop for the movement of the valve body under the action of the spring.

The new construction is in distinct contrast to prior usage wherein a valve body of ball form was seated against a conical rubber surface. With this latter arrangement the ball tended to become embedded in the rubber and in the unseating operation the entire zone of contact was broken simultaneously. With the new construction there is no embedding action and the sealing contact, in the unseating operation, is progressively relieved by a rolling operation of the rubber.

Any undue distortion of the valve seat is prevented by the insert 14 and particularly by the flange 14e which is substantially normal to the lines of pressure of the valve body. However, the invention is not necessarily limited to the use of a backing insert for the valve seat.

The embodiment of the invention shown in Figures 5 and 6 is the same as that just described so far as the relation of the conical valve body and rubber seat is concerned, there being modification of some of the appurtenances only. The insert 21 is of generally the same form as the insert 14, but in this case is made of two parts, a conical fitting 22 being pressed into the belled lower end of the main portion as particularly shown in Figure 6. The insert is incorporated in the rubber body in the same manner as the insert first described and is a rather preferred form since its cup-like lower end, as shown in Figure 5, extends below the compression zone of the valve seat so as to be most effective in restraining the seat against the wedging action of the valve body. The lines of the force exerted by the valve body are substantially normal to the backing means constituted by the lower end of the insert. The valve pin has a head riveted thereon in final assembly, but in the embodiment of Figure 5 the head does not serve as a spring abutment. In this case a compression spring 23 bears with its upper end against the bottom surface of the valve body and is centered by a projection 24 carried by the latter. The lower end of spring 23 seats against an annular abutment 25 whose outer margin is engaged in an annular recess formed in the walls of the stem passage. Or the abutment may be held in place merely by the contractive action of the stem body.

It will be understood that the ledge 22 of insert 21 can be used as a spring abutment in the same manner as the ledge 14e of insert 14, Figure 1.

In Figure 7 the valve provisions are exactly the same as described in connection with Figure 1, the stem, however, comprising merely the stub 26 and the flap 27. In effect the construction is that which would result by eliminating that portion of the body 10 of Figure 1 between the base flap and the lower edge of the internal surface 13b.

In Figure 8 the flap 28 has been raised to a position intermediate the ends of the stub 29.

In Figure 9 the stub 30 lies entirely below the flap 31, the flap being flush with the tip of the stub and the valve pin head projecting only slightly above the flap. The head may be made flush with the flap if desired. The stem of Figure 9 is particularly applicable to football bladders and the like in view of the absence of external projection.

In Figures 7 to 9 it will be noted that the stems are only of sufficient length to accommodate an insert and an adequate spring and to fully accommodate the valve body when in seated position.

In various figures of the drawing the stems are shown in upright position and it will be understood that the terms "upper" and "lower" have been used in the preceding description with reference to this position and merely as a matter of convenience. Also, for the sake of clearness, the stems have been shown in larger than normal size. The term "rubber," as used herein, is intended to include different rubber compounds and other flexible or yieldable materials having such physical characteristics as to render them usable for a valve stem structure.

In all cases the stem body proper is preferably provided with an integral rubber attachment flange or flap. The completed stem is secured to the inflatable article by vulcanization and since the vulcanizing operation has the effect of hardening the rubber of the attachment flap, the bottom face of the flap is preferably only semi-cured in the original molding operation so that the additional vulcanization incident to the application of the stem will leave the flap rubber in about the same condition as that of the main body portion. It will be understood, however, that while this differential vulcanization is a desirable feature it is not an indispensable one in the practice of the invention.

It is to be understood that various modifications, alterations and substitutions of parts may be made in the illustrated embodiments of the invention without departing from the invention shown and described. Such changes are contemplated and intended to be included within the spirit and scope of the following claims.

I claim:

1. A rubber valve stem comprising a molded body portion of flexible rubber having an axial air passage extending therethrough from base to tip, said passage including a conical portion tapered toward the tip of said body portion and including also a portion immediately surmounting said conical portion of such form that the two passage portions have a circular line of mergence constituting a valve seat, the two passage portions in any axial section defining an obtuse angle whose vertex is at said line of mergence, said passage portions being defined by integral portions of said body portion, a conical valve body in said passage with its small end directed toward the tip of said body portion, said valve body being disposed for cooperation with said seat, the vertex angle of said valve body being substantially more acute than the vertex angle of said conical passage portion, said valve body having an initial line contact with said seat which increases to a zone or band of contact when substantial seating pressure is exerted on the valve body in use, the conical surface of said valve body being substantially longer than its possible zone of contact with said seat, and a rigid insert embedded in said body portion in substantially embracing relation to said zone of contact.

2. A rubber valve stem comprising a molded body portion of flexible rubber having an axial air passage extending therethrough from base to tip, said passage including a conical portion tapered toward the tip of said body portion and including also a portion immediately surmounting said conical portion of such form that the two passage portions have a circular line of mergence constituting a valve seat, the two passage portions in any axial section defining an obtuse angle whose vertex is at said line of mergence, said passage portions being defined by integral portions of said body portion, a conical valve body in said passage with its small end directed toward the tip of said body portion, said valve body being disposed for cooperation with said seat, the vertex angle of said valve body being substantially more acute than the vertex angle of said conical passage portion, said valve body having an initial line contact with said seat which increases to a zone or band of contact when substantial seating pressure is exerted on the valve body in use, the conical surface of said valve body being substantially longer than its possible zone of contact with said seat, and a rigid insert embedded in said body portion in substantially embracing relation to said zone of contact, said insert including a portion having a surface substantially normal to and intersected by the lines of the force exerted by said valve body on its seat.

HENRY Z. GORA.